(12) United States Patent
Reusing

(10) Patent No.: US 10,870,963 B2
(45) Date of Patent: Dec. 22, 2020

(54) SUPPORT ASSEMBLY FOR A BUILDING STRUCTURE

(71) Applicant: GOLIATHTECH INC., Magog (CA)

(72) Inventor: Julian Reusing, Magog (CA)

(73) Assignee: Goliathtech Inc., Magog (CA)

( * ) Notice: Subject to any disclaimer, the term of this patent is extended or adjusted under 35 U.S.C. 154(b) by 0 days.

(21) Appl. No.: 16/676,612

(22) Filed: Nov. 7, 2019

(65) Prior Publication Data

US 2020/0071900 A1    Mar. 5, 2020

Related U.S. Application Data

(63) Continuation of application No. 15/814,907, filed on Nov. 16, 2017, now Pat. No. 10,487,469.
(Continued)

(51) Int. Cl.
*E02D 5/22* (2006.01)
*E04B 1/343* (2006.01)
*B62D 21/20* (2006.01)

(52) U.S. Cl.
CPC .......... *E02D 5/223* (2013.01); *E04B 1/34347* (2013.01); *E04B 1/34352* (2013.01); *B62D 21/20* (2013.01)

(58) Field of Classification Search
CPC ..... B62D 21/20; E02D 5/223; E04B 1/34347; E04B 1/34352
See application file for complete search history.

(56) References Cited

U.S. PATENT DOCUMENTS 1,460,283 A ‡ 6/1923 Shutsa ................... B60M 1/20
                                                                191/40
3,655,161 A ‡ 4/1972 Schueler ................. E04G 25/06
                                                               254/100
(Continued)

FOREIGN PATENT DOCUMENTS

AU       2013/200834 A1 ‡ 9/2013
CA          2882893 A1 ‡ 2/2015
(Continued)

OTHER PUBLICATIONS

Intrl. Search Report dated Oct. 29, 2014 in PCT Application No. PCT/CA2014/000645.‡

*Primary Examiner* — James M Ference
(74) *Attorney, Agent, or Firm* — Harness, Dickey & Pierce, PLC

(57) ABSTRACT

A support assembly for supporting a building structure, the building structure having a support frame including at least one support beam, the support assembly comprising: a pile adapted to be buried into a ground surface, the pile having a longitudinal axis; a pile head adapted to be secured to a top end of a pile, the pile head including a mounting member engaging the pile and an extendable member movably mounted to the mounting member, the extendable member being movable relative to the mounting member, along the longitudinal axis, the extendable member including: a support platform adapted to receive the support beam of the mobile home's support frame thereon; and at least one holding member adapted to engage the support beam and prevent movement of the support beam relative to the support platform.

19 Claims, 18 Drawing Sheets

Related U.S. Application Data

(60) Provisional application No. 62/422,631, filed on Nov. 16, 2016.

(56) References Cited

U.S. PATENT DOCUMENTS

| | | | | |
|---|---|---|---|---|
| 3,713,259 A | ‡ | 1/1973 | Tkach | E04B 1/0007 248/352 |
| 3,802,138 A | ‡ | 4/1974 | McCarter | E02D 5/80 248/507 |
| 3,828,491 A | ‡ | 8/1974 | Koon | E04B 1/34347 254/100 |
| 3,830,024 A | ‡ | 8/1974 | Warnke | E04B 1/34347 52/126.7 |
| 4,261,149 A | ‡ | 4/1981 | Gustafson | E04B 1/34352 52/292 |
| 4,417,426 A | ‡ | 11/1983 | Meng | E04B 1/34352 52/126.7 |
| 4,546,581 A | ‡ | 10/1985 | Gustafson | E02D 27/34 52/126.6 |
| 4,738,061 A | ‡ | 4/1988 | Herndon | E02D 27/02 52/126.6 |
| 4,761,924 A | ‡ | 8/1988 | Gustafson | E04B 1/34352 52/126.6 |
| 4,812,080 A | * | 3/1989 | Urquhart | E02B 17/027 405/204 |
| 4,866,797 A | ‡ | 9/1989 | Vollan | E04B 1/34352 52/126.6 |
| 4,870,789 A | ‡ | 10/1989 | Clark | E02D 35/00 52/126.6 |
| 4,882,887 A | ‡ | 11/1989 | Giles | E04B 1/34352 52/126.6 |
| 4,914,875 A | ‡ | 4/1990 | Gustafson | E04B 1/34352 52/126.6 |
| 5,213,448 A | * | 5/1993 | Seider | E02D 27/48 405/229 |
| 5,402,614 A | * | 4/1995 | Jewell | E02D 27/32 248/505 |
| 5,409,192 A | ‡ | 4/1995 | Oliver | E04B 1/34352 248/357 |
| 5,482,407 A | * | 1/1996 | Raaf | E02D 5/00 405/229 |
| 5,515,655 A | ‡ | 5/1996 | Hoffmann | E02D 27/01 248/354.5 |
| 5,595,366 A | ‡ | 1/1997 | Cusimano | E02D 27/34 248/354.3 |
| 5,669,735 A | * | 9/1997 | Blandford | E02B 17/027 405/195.1 |
| 5,707,180 A | ‡ | 1/1998 | Vickars | E02D 5/36 405/23 |
| 5,775,846 A | * | 7/1998 | Blandford | E02B 17/0004 405/227 |
| 5,800,094 A | * | 9/1998 | Jones | E02D 35/00 254/133 R |
| 5,851,446 A | * | 12/1998 | Bardo | E04H 5/12 261/111 |
| 5,862,635 A | ‡ | 1/1999 | Linse | E04H 9/14 52/126.6 |
| 5,873,679 A | * | 2/1999 | Cusimano | E02D 27/48 405/229 |
| 5,980,160 A | ‡ | 11/1999 | Vanderklaauw | B66F 1/00 405/230 |
| 6,074,133 A | ‡ | 6/2000 | Kelsey | E02D 27/12 405/244 |
| 6,094,873 A | * | 8/2000 | Hoffman | E02D 27/01 52/126.6 |
| 6,176,056 B1 | ‡ | 1/2001 | MacKarvich | E02D 5/801 248/499 |
| 6,183,167 B1 | ‡ | 2/2001 | Ruiz | E02D 5/285 403/379.3 |
| 6,318,032 B2 | ‡ | 11/2001 | MacKarvich | E02D 27/02 52/167.3 |
| 6,347,489 B1 | ‡ | 2/2002 | Marshall, Jr. | E02D 27/00 248/354.5 |
| 6,349,512 B1 | ‡ | 2/2002 | Berkey | E04G 25/06 52/126.6 |
| 6,352,390 B1 | * | 3/2002 | Jones | E02D 27/48 405/230 |
| 6,381,907 B1 | ‡ | 5/2002 | MacKarvich | E04B 1/34352 52/105 |
| 6,468,002 B1 | * | 10/2002 | Gregory | E02D 27/48 254/29 R |
| 6,659,692 B1 | * | 12/2003 | May | E02D 35/00 405/230 |
| 6,682,267 B1 | ‡ | 1/2004 | Jones | E02D 5/523 405/230 |
| 6,817,810 B2 | ‡ | 11/2004 | Jones | E02D 5/523 405/230 |
| 6,848,864 B1 | ‡ | 2/2005 | Davie, Jr. | E02D 27/48 405/230 |
| 7,191,569 B2 | ‡ | 3/2007 | Brown | E02D 55/801 52/111 |
| 7,220,081 B1 | ‡ | 5/2007 | Gantt, Jr. | E02D 27/12 405/230 |
| 7,744,316 B2 | ‡ | 6/2010 | Kaufman | E02D 35/00 405/230 |
| 7,922,145 B2 | * | 4/2011 | Martin | B28B 7/0032 248/176.3 |
| 8,156,695 B2 | * | 4/2012 | Smith | E02D 11/00 52/154 |
| 8,402,837 B1 | * | 3/2013 | Jones | G01M 5/0058 73/788 |
| 8,734,058 B1 | * | 5/2014 | Schmidt | E02D 5/64 405/255 |
| 9,027,898 B1 | * | 5/2015 | Holmboe | E04G 25/065 248/354.4 |
| 9,458,593 B2 | | 10/2016 | Hale | |
| 9,631,335 B2 | ‡ | 4/2017 | Reusing | E02D 5/56 |
| D803,342 S | * | 11/2017 | Goff | D22/108 |
| 10,024,020 B2 | * | 7/2018 | Fuller | E02D 7/22 |
| 2003/0041535 A1 | ‡ | 3/2003 | Rupiper | E02D 5/801 52/165 |
| 2003/0159839 A1 | ‡ | 8/2003 | Perko | E02D 5/56 172/10 |
| 2005/0074298 A1 | ‡ | 4/2005 | Jones | E02D 5/523 405/25 |
| 2006/0067794 A1 | ‡ | 3/2006 | Mitchell | E02D 27/48 405/230 |
| 2006/0269364 A1 | * | 11/2006 | May | E02D 5/56 405/232 |
| 2007/0028557 A1 | ‡ | 2/2007 | Kelly | E02D 27/34 52/741.15 |
| 2007/0212172 A1 | ‡ | 9/2007 | Brown | E02D 27/01 405/230 |
| 2008/0063479 A1 | ‡ | 3/2008 | Stroyer | E02D 5/52 405/24 |
| 2010/0143048 A1 | ‡ | 6/2010 | Lin | E02D 5/523 405/244 |
| 2010/0166504 A1 | * | 7/2010 | Patton | E02D 5/00 405/230 |
| 2011/0252722 A1 | * | 10/2011 | Laurin | E02D 27/32 52/126.6 |
| 2012/0155968 A1 | * | 6/2012 | Byun | E02D 35/00 405/230 |
| 2012/0255242 A1 | * | 10/2012 | Patton | E01D 15/14 52/126.6 |
| 2013/0309024 A1 | * | 11/2013 | Jones | E02D 5/56 405/252.1 |
| 2014/0356075 A1 | * | 12/2014 | Hale | E02D 27/16 405/230 |
| 2014/0356076 A1 | * | 12/2014 | Hale | E02D 5/223 405/255 |
| 2014/0363238 A1 | * | 12/2014 | Subitoni | E04H 12/2223 405/252.1 |
| 2015/0361650 A1 | * | 12/2015 | Cothron | E04B 1/34347 52/741.15 |

(56) References Cited

U.S. PATENT DOCUMENTS

| | | | | |
|---|---|---|---|---|
| 2016/0186402 A1* | 6/2016 | Tomchesson | ........... | E02D 5/526 |
| | | | | 405/232 |
| 2016/0215470 A1* | 7/2016 | Reusing | ................ | E02D 35/005 |
| 2018/0135269 A1* | 5/2018 | Reusing | ................. | E02D 5/223 |

FOREIGN PATENT DOCUMENTS

| | | | | |
|---|---|---|---|---|
| CN | 102787596 | A | ‡ | 11/2012 |
| EP | 2006452 | A1 | | 12/2008 |
| JP | 2002-348861 | A | ‡ | 12/2002 |
| JP | 2009-035937 | A | ‡ | 2/2009 |
| KR | 101081566 | B1 | ‡ | 11/2011 |
| NZ | 299662 | A | ‡ | 6/1998 |
| NZ | 595419 | A | | 12/2011 |
| NZ | 716857 | A | ‡ | 2/2017 |
| WO | WO2015/024108 | A1 | ‡ | 2/2015 |
| WO | WO-2015/024108 | A1 | | 2/2015 |

\* cited by examiner
‡ imported from a related application

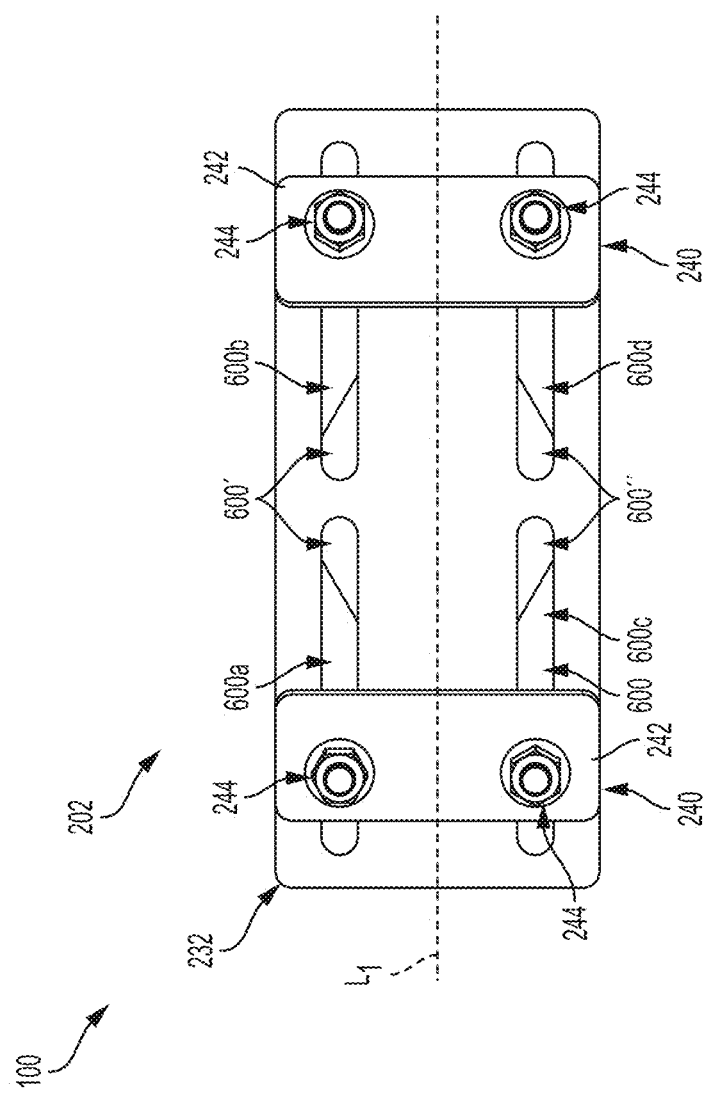

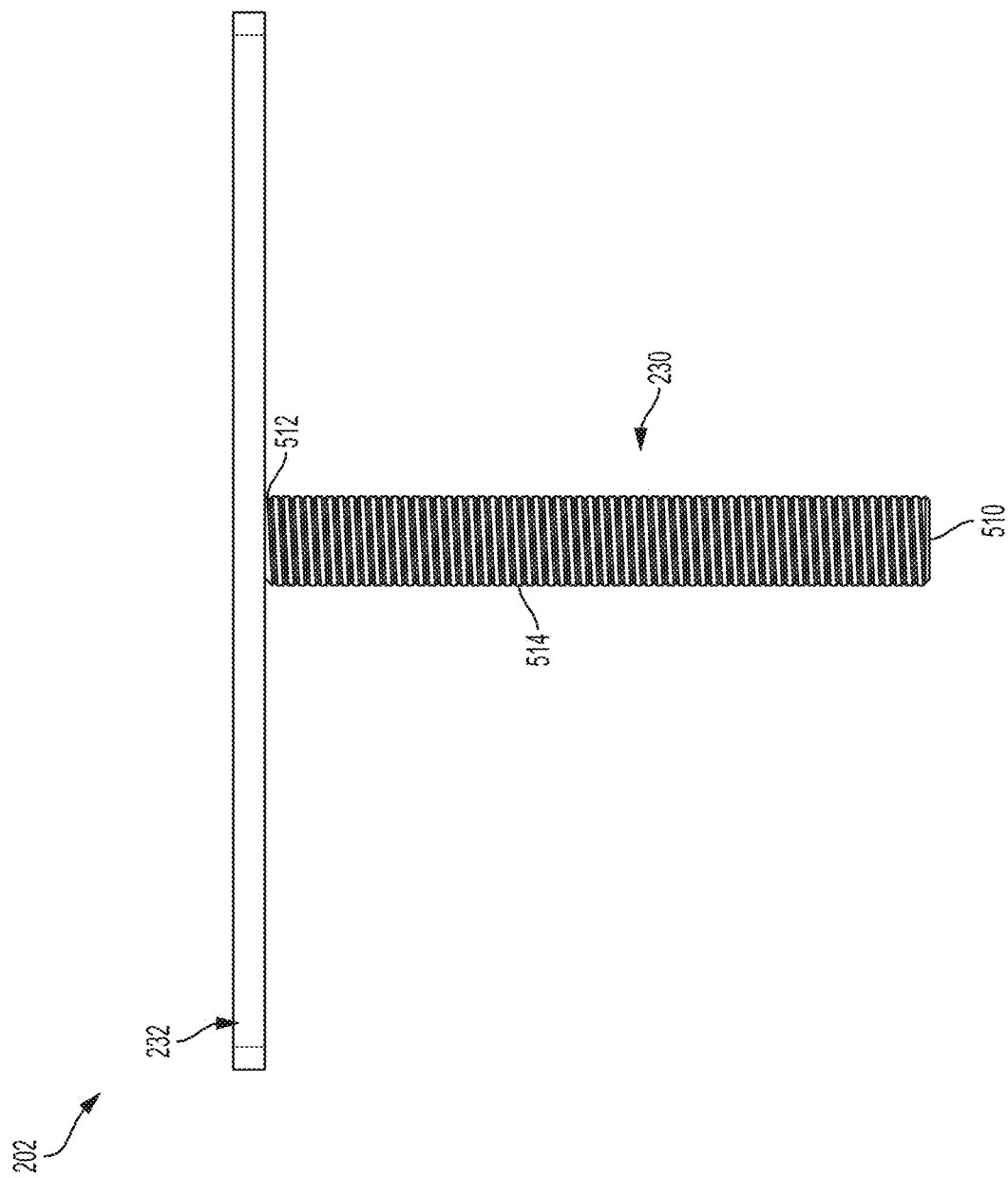

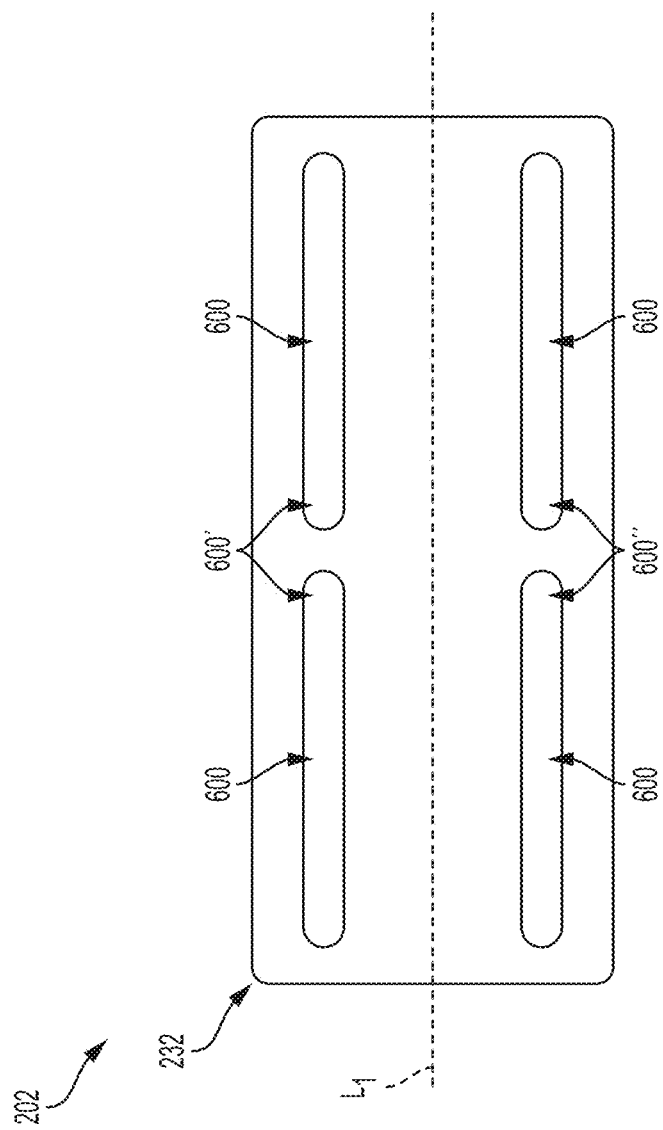

SUPPORT ASSEMBLY FOR A BUILDING STRUCTURE

CROSS-REFERENCE TO RELATED APPLICATIONS

The present application is a continuation of U.S. patent application Ser. No. 15/814,907, now U.S. Pat. No. 10,487,469 filed on Nov. 16, 2017 and entitled "Support Assembly for a Building Structure". Via the '907 application, this application claims priority to U.S. Provisional Patent Application No. 62/422,631, filed on Nov. 16, 2016, entitled "Support Assembly for a Building Structure". Each of the foregoing applications is incorporated by reference herein.

TECHNICAL FIELD

The present invention relates to support assembly for building structures, and more specifically to support assemblies for building structures such as mobile homes.

BACKGROUND

Some building structures such as mobile homes, also known as trailer homes, are prefabricated (i.e. constructed offsite) and then moved to a desired location. To be able to move the structure while preserving its structural integrity, the structures are usually built over a horizontally-extending metal frame which includes one or more I-beams.

Different types of foundations can be provided for mobile homes. Some mobile homes are mounted on piles, and specifically screw piles, which are driven and buried in a ground surface. In this configuration, a pile head is provided on top of the pile, and the mobile home is secured to the pile head. Various devices and techniques have been proposed to secure the metal frame of mobile home to the pile head, but unfortunately, these devices and techniques may be complex, time consuming, difficult to implement or may involve damaging the metal frame. Furthermore, these devices and techniques may not allow any adjustment during installation at the desired location.

There is therefore a need for a device which would overcome at least one of the above-identified drawbacks.

SUMMARY

According to one aspect, there is provided a support assembly for supporting a building structure, the building structure having a support frame including at least one support beam, the support assembly comprising: a pile adapted to be buried into a ground surface, the pile having a longitudinal axis; a pile head adapted to be secured to a top end of a pile, the pile head including a mounting member engaging the pile and an extendable member movably mounted to the mounting member, the extendable member being movable relative to the mounting member, along the longitudinal axis, the extendable member including: a support platform adapted to receive the support beam of the mobile home's support frame thereon; and at least one holding member adapted to engage the support beam and prevent movement of the support beam relative to the support platform.

In one embodiment, the pile head further includes at least one fastener for removably fastening the mounting member of the pile head to the top end of the pile and preventing unwanted movement of the pile head relative to the pile, along the longitudinal axis.

In one embodiment, the mounting member comprises a threaded hole extending along the longitudinal axis, and the extendable member comprises a threaded shaft threadably engaging the threaded hole.

In one embodiment, the threaded shaft of the extendable portion comprises a top end, a bottom end and a threaded surface extending therebetween, the support platform being secured to the top end of the threaded shaft.

In one embodiment, the support platform is generally planar and is disposed orthogonally to the threaded shaft.

In one embodiment, each holding member includes a jaw member adapted to engage a bottom horizontal beam flange of the support beam.

In one embodiment, each jaw member includes a plate member and at least one holding fastener extending through the plate member and the support platform.

In one embodiment, each one of the at least one holding fasteners includes a bolt and a corresponding nut.

In one embodiment, the plate member includes a body having at least one fastener opening to receive the at least one holding fasteners, each fastener opening being generally circular and offcentered towards a side edge of the body.

In one embodiment, the support platform includes at least one fastener opening adapted for receiving the holding fastener.

In one embodiment, the at least one fastener opening is generally elongated.

In one embodiment, the support platform is generally elongated and defines a platform longitudinal axis, the at least one fastener opening extending parallel to the platform longitudinal plate axis.

In one embodiment, the at least one fastener opening includes a first pair of fastener openings disposed along a first common axis and spaced longitudinally from each other and a second pair of fastener openings disposed along a second common axis and spaced longitudinally from each other, the first and second pairs of fasteners openings being spaced from each other in a transversal direction relative to the platform longitudinal axis.

In one embodiment, the at least one fastener opening is sized and shaped to allow the holding fastener to be angled relative to the support platform.

In one embodiment, the support assembly further includes at least one brace bracket to allow the support assembly to be connected to another support assembly by a brace member.

In one embodiment, the at least one brace bracket includes an upper brace bracket secured to the extendable member and a lower brace bracket secured to the pile.

In one embodiment, the support assembly further includes a lateral reinforcement assembly attached to the pile to increase the pile's capacity to resist loads applied laterally.

In one embodiment, the building structure includes a mobile home.

According to another aspect, there is also provided a pile head for a support assembly for supporting a building structure, the building structure having a support frame including at least one support beam, the support assembly having a pile adapted to be buried into a ground surface, the pile having a longitudinal axis, the pile head comprising: a mounting member engaging a top end of the pile; and an extendable member movably mounted to the mounting member, the extendable member being movable relative to the mounting member, along the longitudinal axis, the extendable member including: a support platform adapted to receive the support beam of the mobile home's support frame thereon; and at least one holding member adapted to engage the support beam and prevent movement of the support beam relative to the support platform.

BRIEF DESCRIPTION OF THE DRAWINGS

FIG. 6A is a top plan view of the support assembly illustrated in FIG. 2, with the support beam removed to show details of the support platform and the holding members;

FIG. 7 is a front elevation view of an extendable member for the support assembly illustrated in FIG. 2;

FIG. 8 is a top plan view of the extendable member for the support assembly illustrated in FIG. 2;

DETAILED DESCRIPTION

Figure 1:
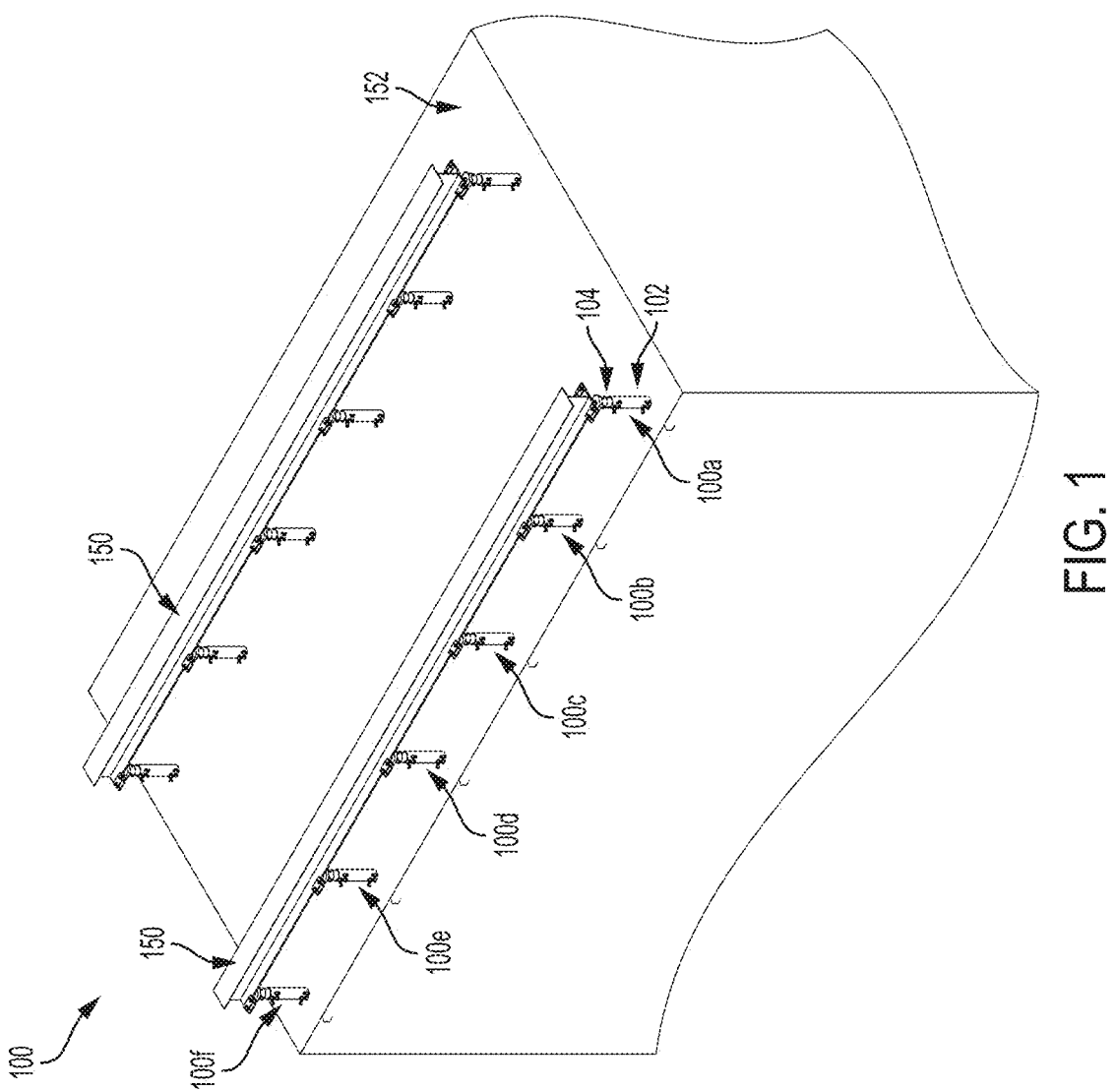
FIG. 1 is a top left perspective view of a plurality of support assemblies for a mobile home, in accordance with one embodiment, with the support structure buried in a ground surface and engaging two support beams.
Figure 2:
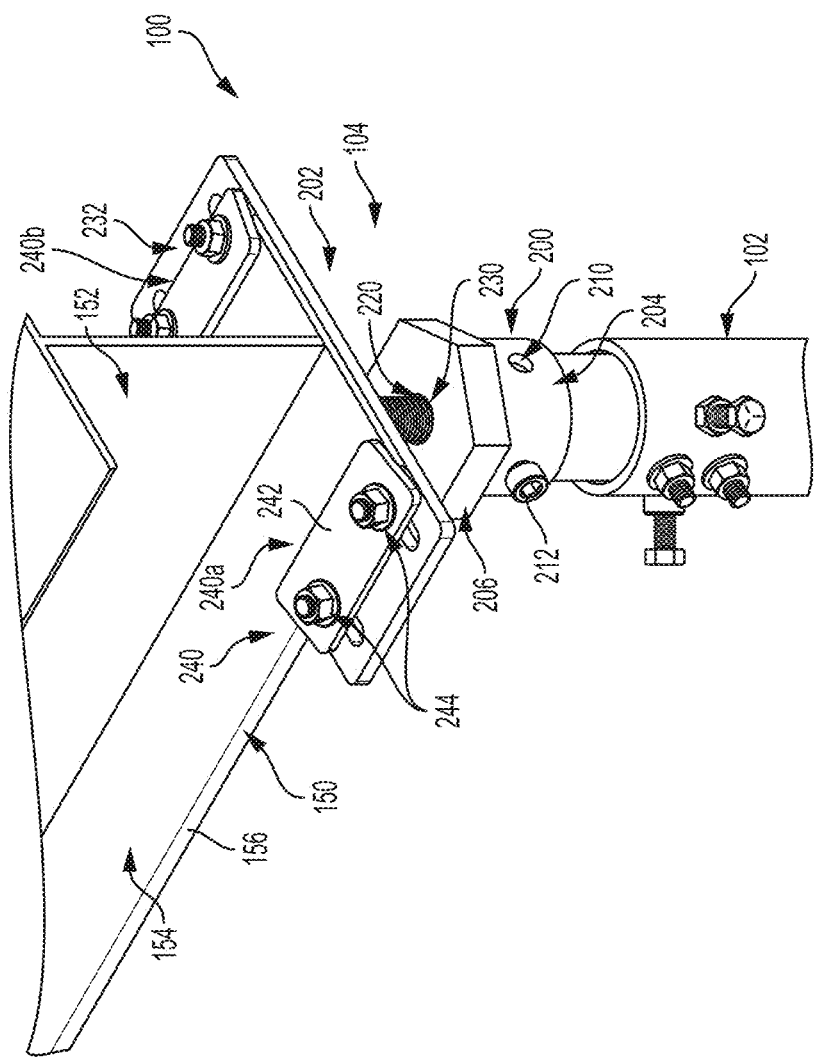
FIG. 2 is an enlarged top left perspective view of one of the support assemblies illustrated in FIG. 1.
Figure 3:
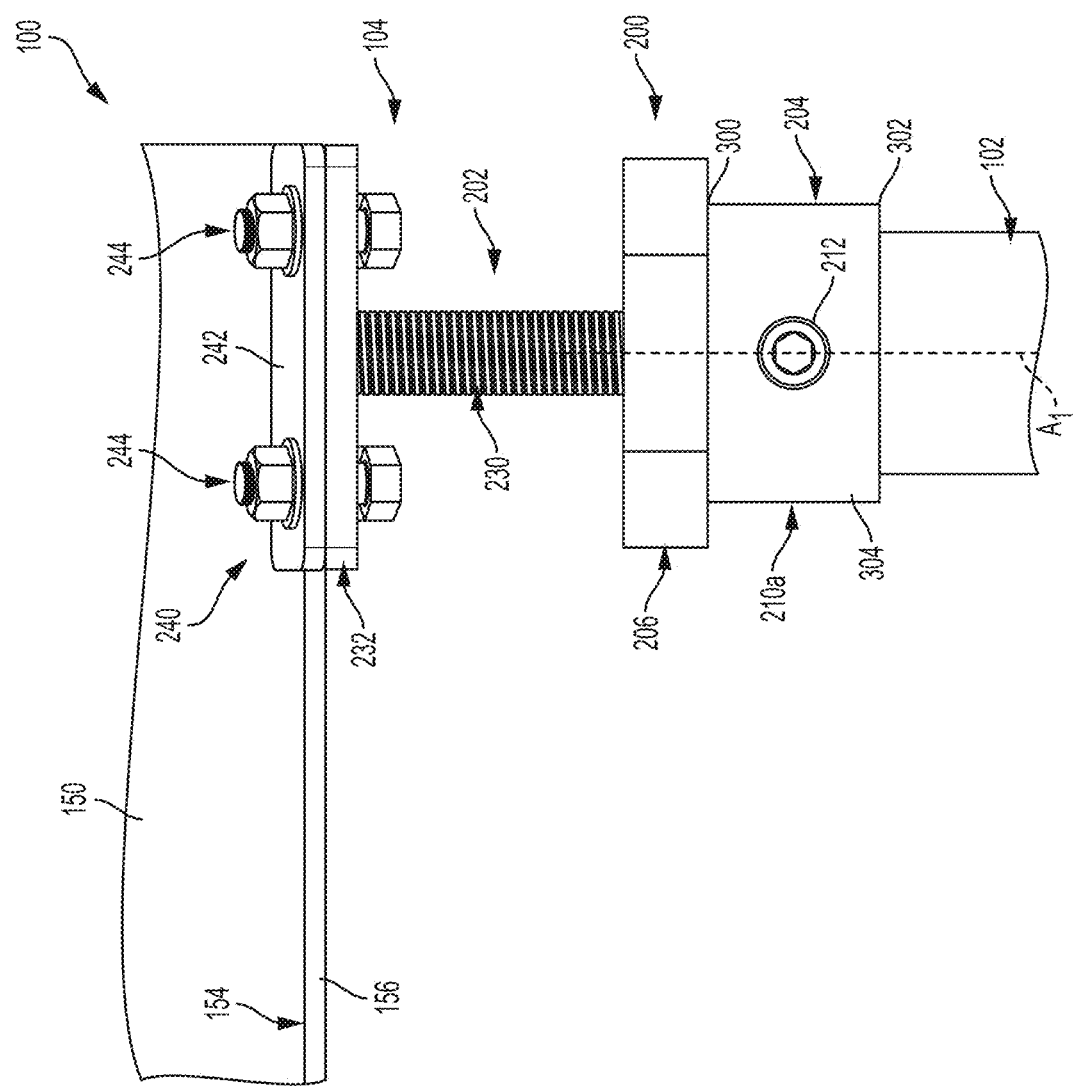
FIG. 3 is a left side elevation view of the support assembly illustrated in FIG. 2.

Referring first to FIG. 1, there is shown a plurality of support assemblies 100 for a structure such as a mobile home, in accordance with one embodiment. More specifically, FIG. 1 shows two support beams 150 from a support frame of a mobile home, not shown, each support beam 150 being supported by first, second, third, fourth, fifth and sixth support assemblies 100a, 100b, 100c, 100d, 100e, 100f which are partially buried in a ground surface 160. It will be understood that each support beam 150 could instead be supported by more or less than six support assemblies depending of various factors such as the size of the beams, the weight of the mobile home or any other factor that a skilled addressee may deem appropriate to consider.

In the illustrated embodiment, the support beams 150 include I-beams which have an I-shaped cross-section. Alternatively, the support beams 150 may have a different cross-sectional shape.

Figure 5:
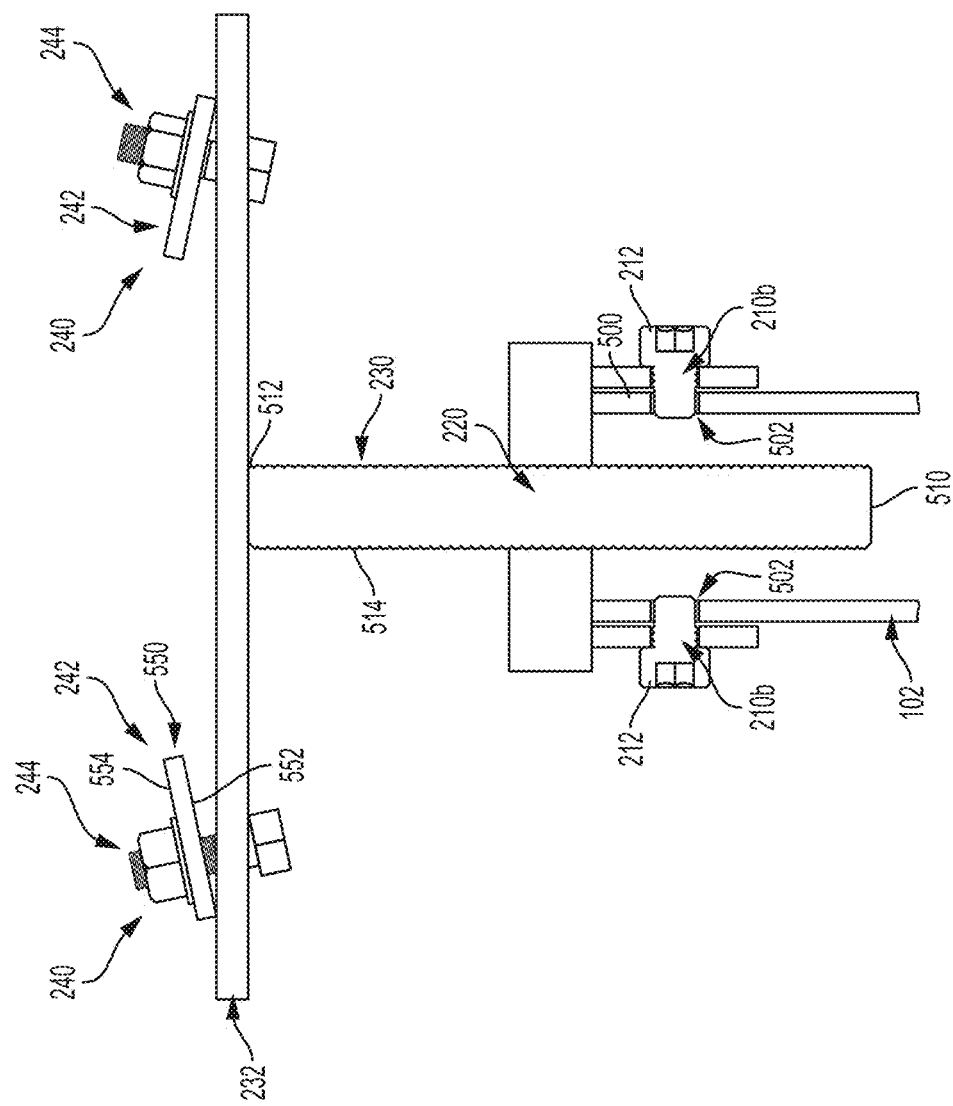
FIG. 5 is a front side cross-section view, taken along a vertical plane, of the support assembly illustrated in FIG. 2, with the support beam removed.

Still referring to FIG. 1, each support assembly 100 includes a pile 102 and a pile head 104 mounted to a top end 500 of the pile 102, shown in FIG. 5. In one embodiment, the pile 102 is a standard screw pile which include a helical member, not shown, located at a bottom end of the screw pile to allow insertion of the screw pile into the ground surface 160 when the screw pile is rotated. The screw pile may be made of a single, unitary piece, or may include a plurality of pile sections connected together by connecting sleeves and corresponding fasteners. In one embodiment, the helical member could further be detachable from the pile 102 or, alternatively, be integrally formed with the pile 102.

Now referring to FIGS. 2 to 5, the first support assembly 100a will be further described. It will be understood that all support assemblies 100 are similar and therefore that the same description applies to all support assemblies 100 illustrated in FIG. 1.

In the illustrated embodiment, the pile head 104 includes a mounting member 200 for mounting the pile head 104 to the pile 102 and an extendable member 202 movably mounted to the mounting member 200. The extendable member 202 is also adapted for receiving the support beam 150 and to move vertically relative to the mounting member 200 to thereby raise or lower the support beam 150 and/or to level the support beam 150.

In the illustrated embodiment, the mounting member 200 includes a sleeve portion 204 adapted to engage the top end 500 of the pile 102 and a plate portion 206 disposed above the sleeve portion 204. Specifically, the sleeve portion 204 is hollow and has a top end 300, a bottom end 302 and a sidewall 304 extending between the top and bottom ends 300, 302. The plate portion 206 extends generally orthogonally to a longitudinal axis $A_1$ of the sleeve portion 204, best shown in FIG. 3, and is fixedly secured to the top end 300 of the sleeve portion 204.

Still referring to FIGS. 2 to 5, the sidewall 304 is sized and shaped to allow the sleeve portion 204 to be placed over the top end 500 of the pile 102. In this configuration, the top end 500 of the pile 102 is therefore received in the sleeve portion 204 and can be inserted in the sleeve portion 204 through the sleeve portion's bottom end 302. In one embodiment, the top end 500 of the pile 102 could further abut the plate portion 206 when fully inserted in the sleeve portion 204.

In the illustrated embodiment, the pile 102 is cylindrical and the sleeve portion 204 is similarly cylindrical. Alternatively, both the pile 102 and the sleeve portion 204 could have a rectangular cross-section, or have any other matching cross-section shapes that a skilled person would consider to be appropriate.

Figure 4A:
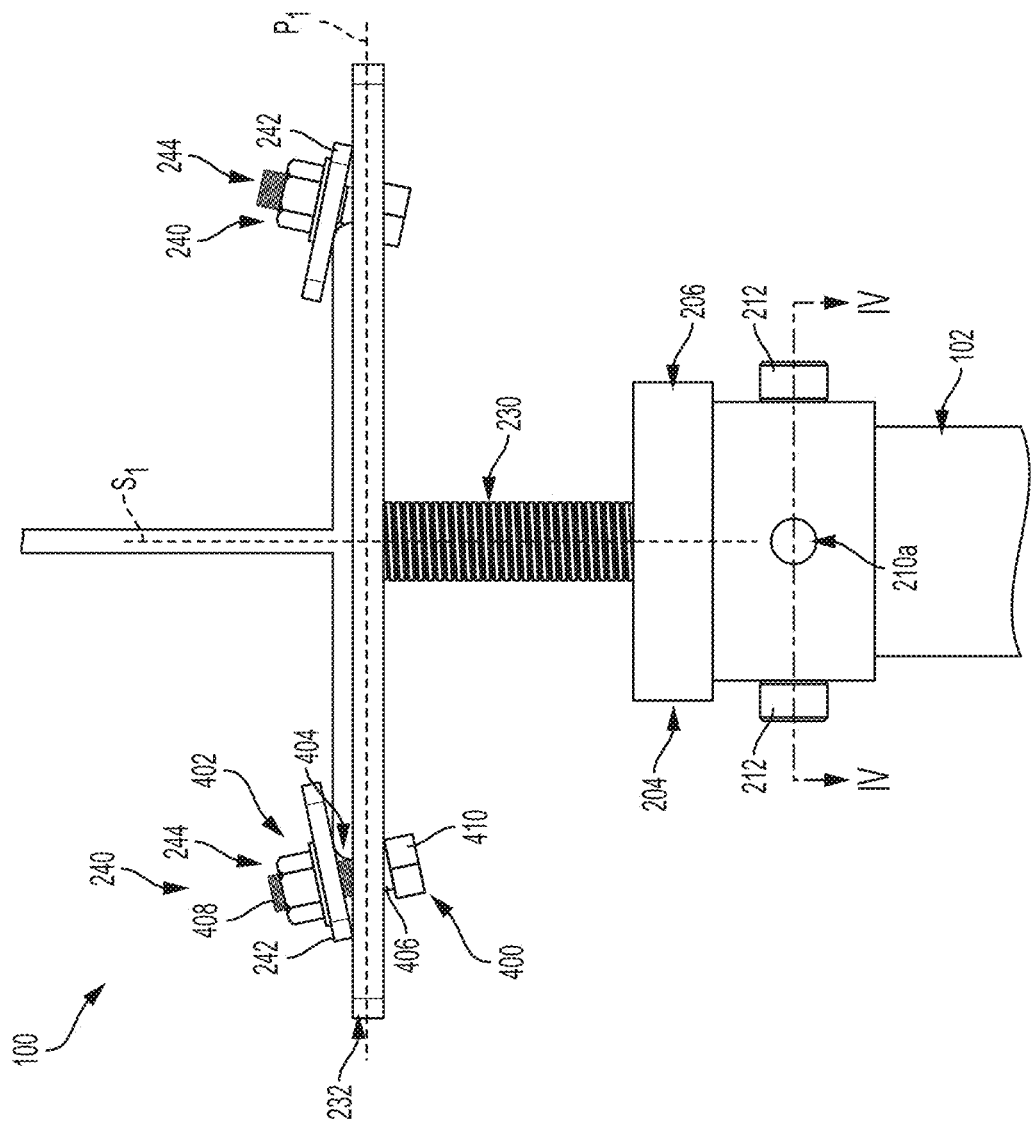
FIG. 4A is a front side elevation view of the support assembly illustrated in FIG. 2.
Figure 4B:
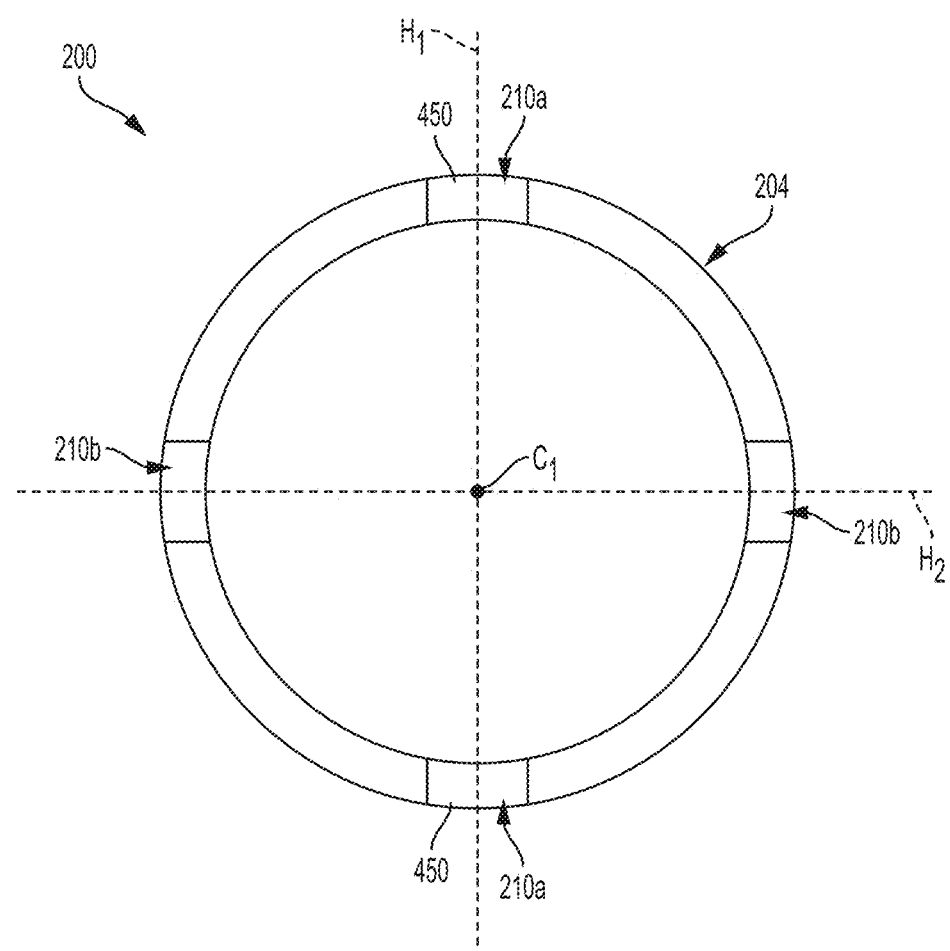
FIG. 4B is a cross-section view of a pile head for the support assembly illustrated in FIG. 4, taken along cross-section line IV-IV, showing the pile head in isolation to better appreciate the position of the mounting openings in the pile head.

In the illustrated embodiment, the sleeve portion 204 further includes a first pair of radially opposed mounting openings 210a and a second pair of radially opposed mounting openings 210b. Still in the illustrated embodiment, the mounting openings 210a, 210b are generally aligned with radii of the sleeve portion 204, as best shown in FIG. 4B. Specifically, the first pair of mounting openings 210a are disposed along a generally horizontal first axis $H_1$ which passes through a center $C_1$ of the sleeve portion's cross-section and the second pair of mounting openings 210b are disposed along a generally horizontal second axis $H_2$ which also passes through the center $C_1$ of the sleeve portion's cross-section. Moreover, the first axis $H_1$ of the first pair of mounting openings 210a extends generally perpendicularly to the second axis $H_2$ of the second pair of mounting openings 210b. Alternatively, the first axis $H_1$ could be angled relative to the second axis $H_2$ at an angle which is more or less than 90 degrees. In yet another embodiment, the first and second pairs of mounting openings 210a, 210b could be offcentered on the sleeve portion 204 such that the first and second axes $H_1$, $H_2$ do not passes through the center $C_1$ of the sleeve portion's cross-section.

As best shown in FIG. 5, each mounting opening 210 is sized and shaped to receive a head fastener 212 which extends through the sidewall 304 of the sleeve portion 204 and through corresponding bores 502 defined in the pile 102 near the top end 500 of the pile 102. This prevents movement of the pile head 104 relative to the pile 102 along the longitudinal axis of the pile 102, both downwardly and upwardly.

In one embodiment, the head fastener 212 is threaded and each mounting openings 210a, 210b includes an opening sidewall 450, best shown in FIG. 4B, which is internally threaded to engage the head fastener 212. The corresponding bores 502 of the pile 102 could also be internally threaded to also engage the head fastener 212. Alternatively, the head fastener 212 may be unthreaded and may include a pin engaging similarly unthreaded mounting openings and corresponding unthreaded bores of the pile 102. It will also be appreciated that the pile head 104 and the pile 102 could have a different number of mounting openings 210 and corresponding bores 502.

In an alternative embodiment, the first pair of radially opposed mounting openings 210a are adapted to receive corresponding head fasteners 212 and the second pair of radially opposed mounting openings 210b are adapted to receive set screws to further prevent movement of the pile head 104 relative to the pile 102. In yet another embodiment, the sleeve portion 204 may include more or less than two pairs of radially opposed mounting openings.

In the illustrated embodiment, the plate portion 206 is hexagonal and allows the entire mounting member 200 to be rotated relative to the pile 102 using a suitable tool such as a wrench. Alternatively, the plate portion 206 could be circular or have any other shape.

Still in the illustrated embodiment, the plate portion 206 further includes a threaded hole 220, best shown in FIG. 5, located generally at the center of the plate portion 206 and extending through the plate portion 206 along the longitudinal axis of the sleeve portion 204. The threaded hole 220 is sized and shaped for receiving the extendable member 202, as will be explained below.

Referring to FIGS. 2 to 8, the extendable member 202 includes a threaded shaft 230 and a support platform 232 secured to the threaded shaft 230. As best shown in FIG. 5, the threaded shaft 230 has a lower end 510, an upper end 512 and a threaded surface 514 extending between the lower and upper ends 510, 512. The threaded surface 514 is configured to engage the threading in the threaded hole 220 of the mounting member's plate portion 206.

In the illustrated embodiment, the support platform 232 is secured to the upper end of the threaded shaft 230. Specifically, the support platform 232 is generally planar and defines a platform plane $P_1$ which extends generally orthogonally to a shaft axis $S_1$ defined by the threaded shaft 230.

Still in the illustrated embodiment, the support platform 232 is further generally rectangular and elongated, and defines a platform longitudinal axis $L_1$, as shown in FIGS. 6 and 8. Alternatively, the support platform 232 could have any other shape which a skilled person would consider to be appropriate.

In the illustrated embodiment, the support platform 232 includes a plurality of fasteners openings 600 defined in the support platform 232. Specifically, the support platform 232 includes four fastener openings 600a, 600b, 600c, 600d. Each fastener opening 600 is generally elongated and extends generally parallel to the platform longitudinal axis $L_1$. Still in the illustrated embodiment, the plurality of fasteners openings 600 defines a first pair of fastener openings 600' disposed along a first common axis and spaced longitudinally from each other, and a second pair of fastener openings 600" also disposed along a second common axis and spaced longitudinally from each other, the first and second pairs of fasteners openings 600', 600" being spaced from each other in a transversal direction relative to the platform longitudinal axis $L_1$.

Alternatively, instead of first and second pairs of fastening openings 600, the plurality of fasteners openings 600 could include only two elongated openings which would be longer than the four fastener openings 600a, 600b, 600c, 600d described above. Specifically, each elongated opening could have a first end located near a first end of the support platform 232 and a second end located near the second end of the support platform 232 and the two elongated openings could be spaced in a transversal direction from each other.

In yet another embodiment, the plurality of fasteners openings 600 could include more or less than two pairs of fasteners openings 600', 600" spaced from each other and distributed across a width of the support platform 232 in a transversal direction relative to the platform longitudinal axis $L_1$.

Referring now specifically to FIGS. 2 to 6, the extendable member 202 further includes a plurality of holding members 240 adapted to engage the support beam 150 and to prevent movement of the support beam 150 relative to the support platform 232. In the illustrated embodiment, the plurality of holding members 240 includes two holding members 240a, 240b, each one being associated with two of the fastener openings 600 of the support platform 232.

In the illustrated embodiment, the support beam 150 is an I-beam which includes a pair of opposed top and bottom horizontal beam flanges 152, 154 and a central web member 156 which extends generally vertically between the top and bottom beam flanges 152, 154. The bottom beam flange 154 defines a generally planar bottom surface which is adapted to be received on the support platform 232 and a pair of opposite top surface which extend generally horizontally away from the central web member 156. The bottom beam flange further defines a pair of opposite horizontal outer flange edges 158 which extend between the top flange surface and the bottom flange surface, away from the central web member 156.

Still in the illustrated embodiment, the holding members 240 includes jaw members which are adapted to engage the horizontal beam flanges 154. Specifically, each holding member 240 includes a plate member 242 adapted to abut an upper surface of the horizontal beam flange 154 and a pair of holding fasteners 244 adapted to extend through the plate member 242 and the support platform 232 to hold the bottom beam flange 154 between the plate member 242 and the support platform 232.

Figure 6B:
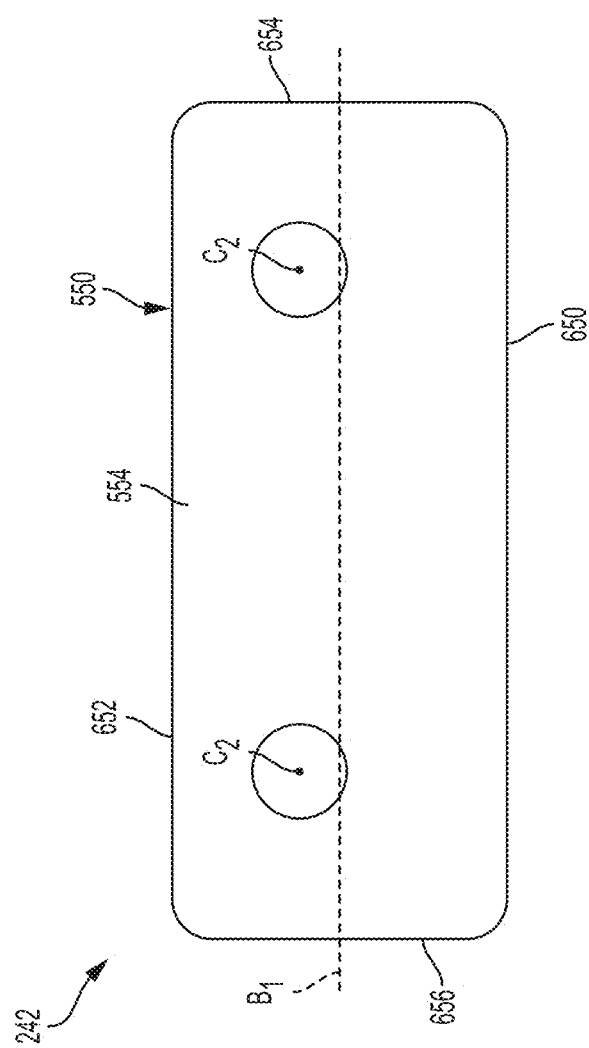
FIG. 6B is a top plan view of a plate member for the holding members of the support assembly illustrated in FIG. 1.

Referring specifically to FIGS. 5 and 6B, the plate member 242 includes a generally flat and rectangular body 550 which has a planar bottom face 552 and a planar top face 554 opposite the bottom face 552. When the holding member 240 is properly installed on the support platform 232, the bottom face 552 is disposed towards the support platform 232 and the top face 554 is disposed away from the support platform 232, as shown in FIG. 5.

In the illustrated embodiment, the body 550 has rounded corners, but could instead have squared corners. Still in the illustrated embodiment, the body 550 has first and second side edges 650, 652 which are generally parallel to each other and third and fourth side edges 654, 656 which are generally parallel to each other and perpendicular to the first and second side edges 650, 652. The first and second side edges 650, 652 are longer than the third and fourth side edges 654, 656, and the plate member 242 is disposed such that the first and second side edges 650, 652 are generally perpendicular to the platform longitudinal axis $L_1$. When the support beam 150 is held by the holding members 240, the first side edge 650 is disposed towards the beam flange and above the beam flange 154, and the second side edge 652 is located away from the beam flange 154.

In the illustrated embodiment, the plate member 242 further includes a pair of fastener openings 658 which extends through the body 550 to receive the holding fasteners 244. Still in the illustrated embodiment, the fastener openings 658 are generally circular and are offcentered towards the second side edge 652 of the body. Specifically, the body is elongated and defines a body longitudinal axis $B_1$, and each fastener opening 658 has a center $C_2$ which is located between the body longitudinal axis $B_1$ and the second side edge of the body. In this configuration, the plate member 242 is generally angled relative to the support platform 232 when the beam flange 154 engages the holding member 240, as best shown in FIGS. 4 and 5.

Referring back to FIGS. 2 to 6, each one of the pair of holding fastener 244 includes a bolt 400 and a corresponding nut 402. Specifically, the bolt 400 includes a bolt body 404 having a first end 406 and a second end 408 and a bolt head 410 located at the first end 406 of the bolt body 404. As best shown in FIG. 4, the bolt body 404 extends through a corresponding fastener opening 658 of the plate member 242 and through a corresponding fastener opening 600 of the support platform 232. In this configuration, the bolt head 410 is located under the support platform 232 and abuts the underside of the support platform 232. Still in the illustrated embodiment, the nut 402 further engages the second end 408 of bolt body 404. Specifically, the nut 402 is located above the plate member 242 and abuts the top face 554 of the plate member 242 to thereby sandwich the outer flange edge 158 of the horizontal beam flange 154 between the support platform 232 and the plate member 242. In this configuration, the bolt body 404 also abuts the outer flange edge 158 of the horizontal beam flange 154, which further prevents lateral movement of the support beam 150 relative to the support platform 232.

Alternatively, the bolt 400 could be reversed such that the bolt head 410 could be located above the plate member 242 and the nut 402 could be located below the support platform 232. In yet another embodiment, other types of fasteners could be used instead of bolts and corresponding nuts.

It will be appreciated that the configuration described above prevents both lateral and vertical movement of the support beam 150 relative to the support platform 232. When the holding fasteners 244 are tightened, the holding members 240 firmly hold the horizontal beam flange 154 in a vice-like arrangement, which eliminates the need to make holes into the support beam 150 or otherwise damage the support beam 150.

It will also be appreciated that when the holding fasteners 244 are tightened, the holding fasteners 244 and the plate members 242 are angled inwardly relative to the support platform 232, as best shown in FIG. 4. This allows the plate members 242 to hold the horizontal beam flange 154 and prevent movement of the support beam 150 relative to the support platform 232 both vertically and laterally.

It will also be appreciated that in the configuration illustrated and described above is mirrored on both sides of the support beam 150. Specifically, each holding fastener 244 and each plate member is angled towards opposite holding fastener 244 and plate member 242. This configuration further prevents movement of the support beam 150 relative to the support platform 232 both vertically and laterally.

It will further be appreciated that the elongated fastener openings 600 in the support platform 232 allow the holding fasteners 244 to be moved laterally along the support platform 232. This allows the holding fasteners 244 to be repositioned to accommodate support beams having different width for instance, or if the support beam 15 is not perfectly centered relative to the support platform 232.

Furthermore, the configuration described above allows the support platform 232 to be selectively raised and lowered simply by removing the head fasteners 212 and rotating the mounting member of the pile head 104 relative to the pile, for example using a wrench or another similar tool. It will be appreciated that the support beam 150 held by the extendable member 202 will prevent the extendable member 202 from rotating when the mounting member 200 is rotated. Therefore, the mounting member 200 will rotate relative to the extendable member 202 and the threaded shaft 230 engaging the threaded hole 220 of the mounting member 200 will cause vertical movement of the extendable member 202 relative to the mounting member. This allows the height of the support beam 150 to be adjusted and/or the support beam 150 to be leveled. Once the support beam 150 has been adjusted to a desired height or leveled, the head fasteners 212 can be re-inserted into the corresponding mounting openings 210 and bores 502 to prevent further rotation of the mounting portion 200 relative to the pile 102.

Figure 9:
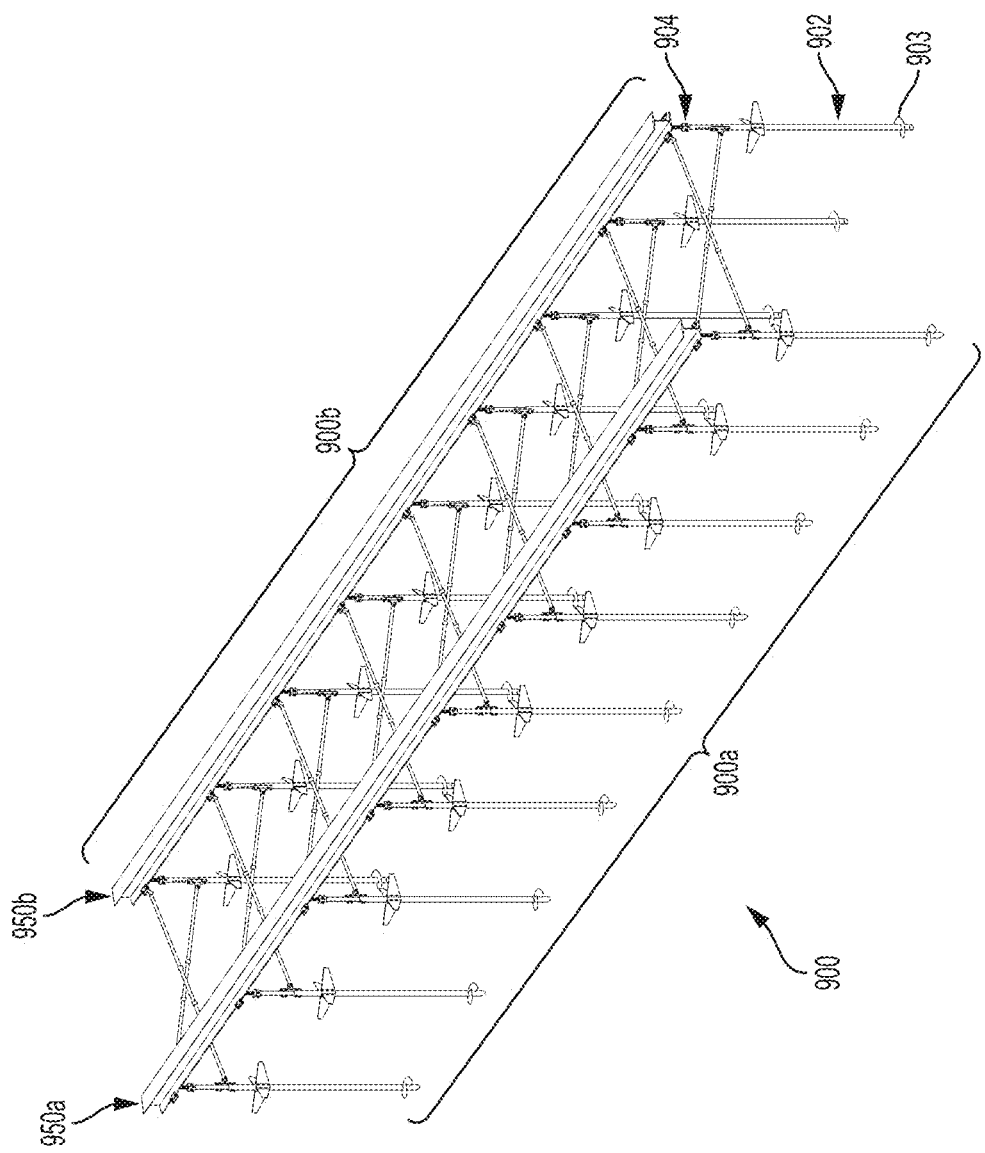
FIG. 9 is a top perspective view of a plurality of support assemblies for a mobile home, in accordance with an alternative embodiment.
Figure 10:
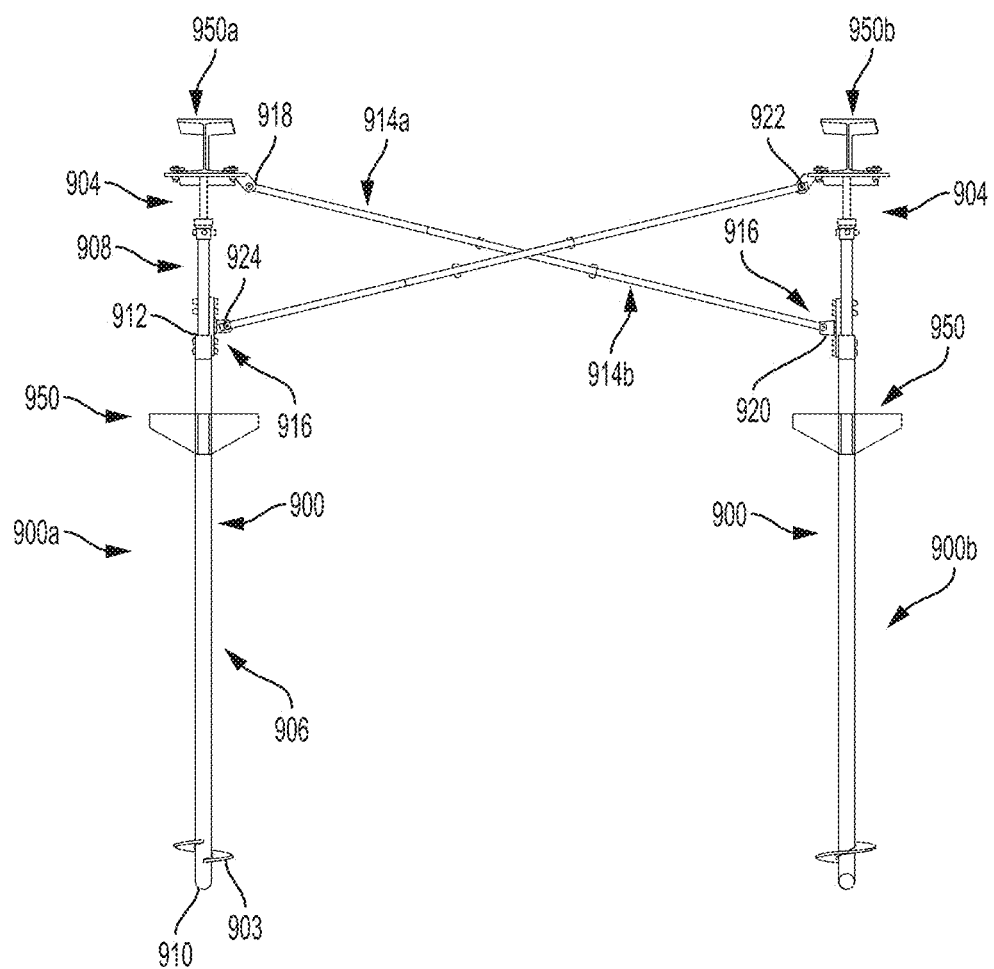
FIG. 10 is a front elevation view of the plurality of support assemblies illustrated in FIG. 9.
Figure 11:
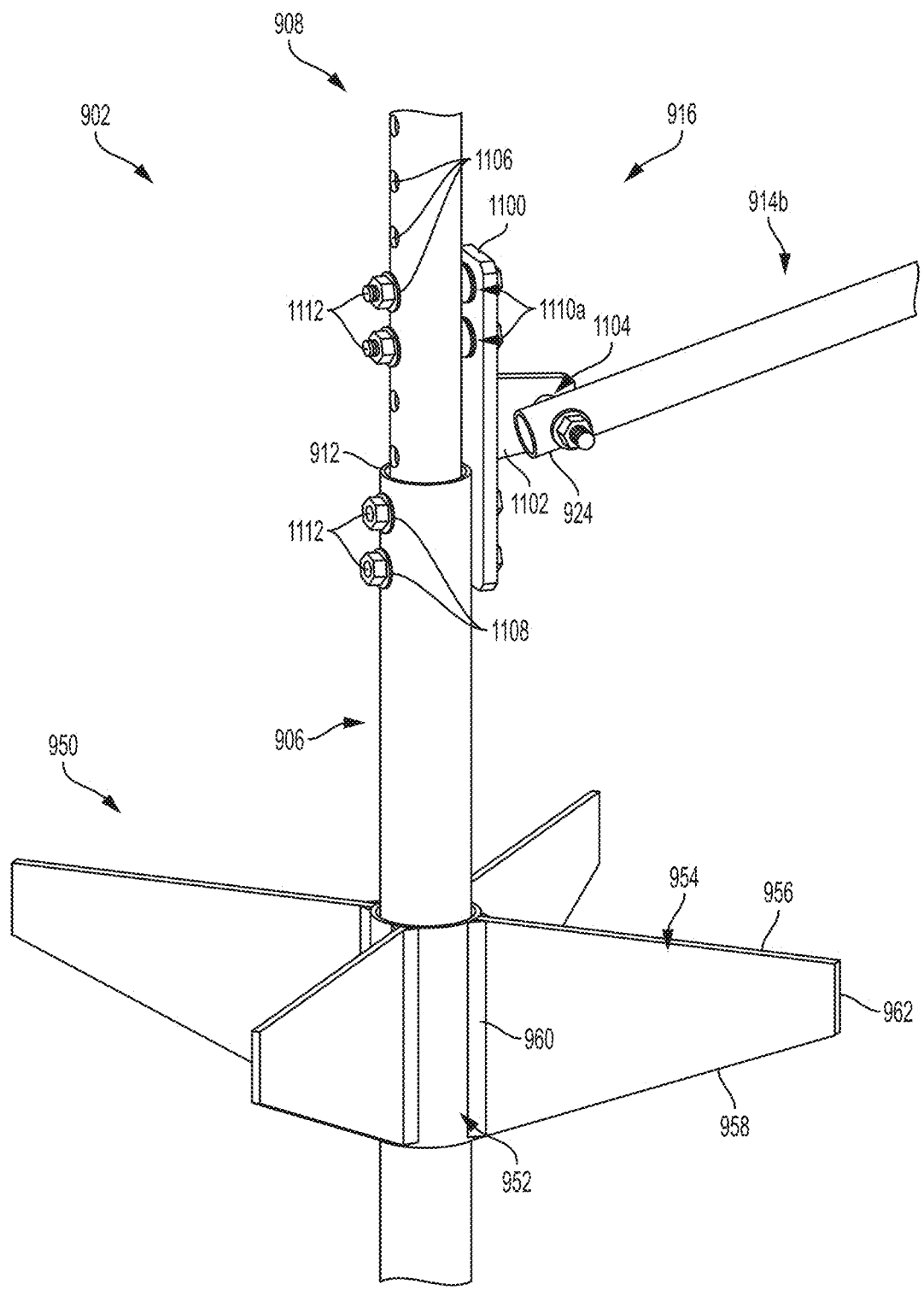
FIG. 11 is a top left perspective view of one of the support assemblies illustrated in FIG. 9, enlarged to show details of the lower brace bracket and the lateral reinforcement assembly.
Figure 12:
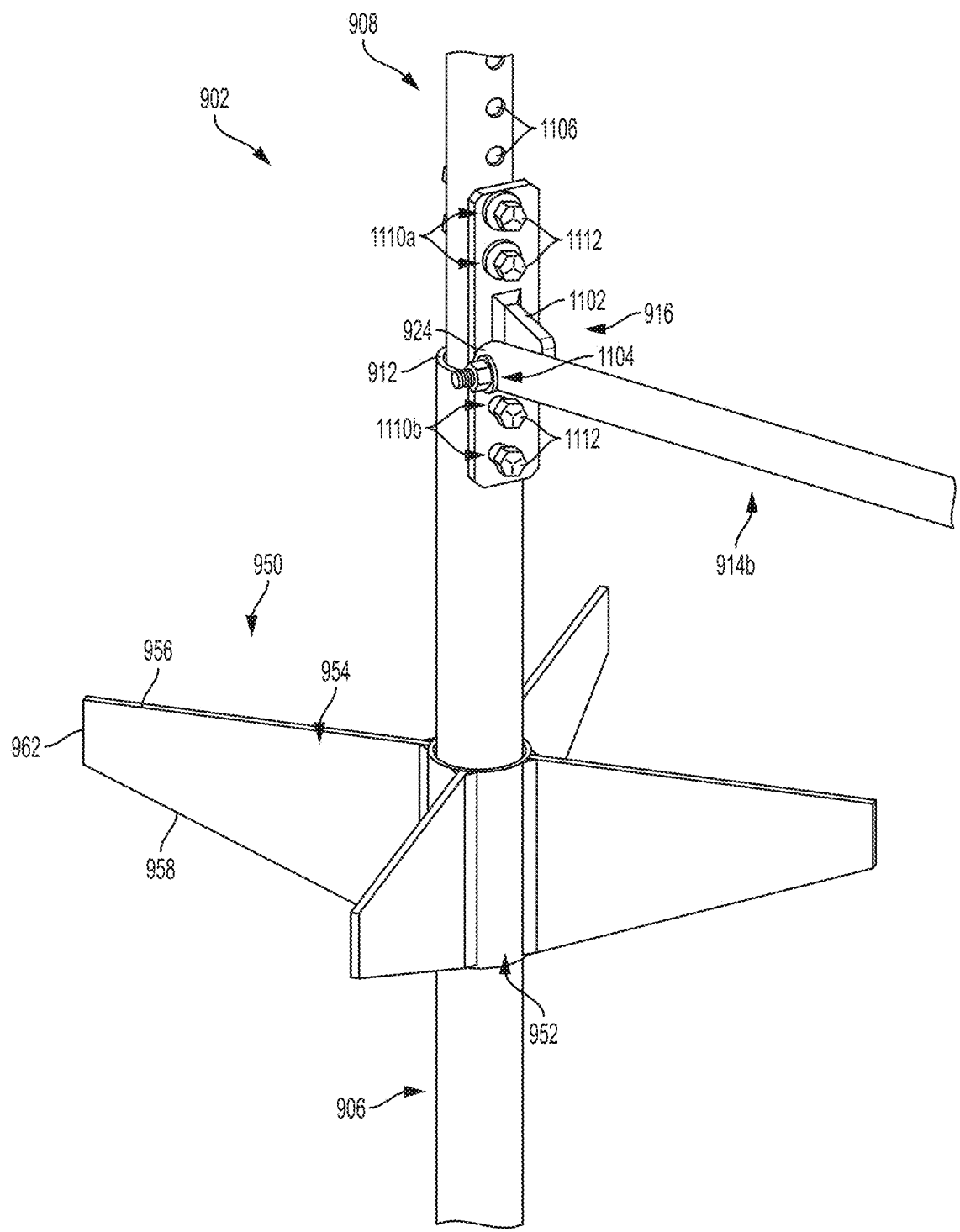
FIG. 12 is a top right perspective view of one of the support assemblies illustrated in FIG. 9, enlarged to again show details of the lower brace bracket and the lateral reinforcement assembly.

Now turning to FIGS. 9 and 10, there is shown a plurality of support assemblies 900 for a structure such as a mobile home, in accordance with an alternative embodiment. More specifically, FIG. 9 shows a first support beam 950a and a second support beam 950b from a support frame of a mobile home, not shown. The first support beam 950a is supported by a first row of support assemblies 900a and the second support beam 950b is supported by a second row of support assemblies 900b disposed parallel to the first row of support assemblies 900a. Similarly to the support assemblies 100 described above, the support assemblies 900 are buried in a ground surface, not shown, and the number of support assemblies 900 used may vary depending of various factors such as the size of the beams, the weight of the mobile home or any other factor that a skilled addressee may deem appropriate to consider.

The support assemblies 900 are generally similar to the support assemblies 100 described above. Specifically, each support assembly 900 includes a pile 902 and a pile head 904 mounted to the pile 902. In the illustrated embodiment, the pile 902 includes a screw pile and therefore has a helical member 903 to allow insertion of the pile 902 into the ground surface. Alternatively, the pile 902 may include any other type of pile that a skilled addressee may consider to be appropriate.

Still referring to FIGS. 9 and 10, the pile 902 includes a plurality of pile segments 906, 908 attached together to form the pile 902. Specifically, the pile 902 includes a bottom pile segment 906 and a top pile segment 908 connecting the bottom pile segment 906 to the pile head 904. The bottom pile segment 906 includes a bottom end 910 to which the helical member 903 is secured and an opposed top end 912 which is hollow for receiving the top pile segment 908.

In the illustrated embodiment, the support assemblies 900 are further adapted to be connected together using a pair of crossed brace members 914a, 914b which extend between the first and second rows of support assemblies 900a, 900b, as will be explained further below. Alternatively, the support assemblies 900 could be provided without brace members.

Figure 13:
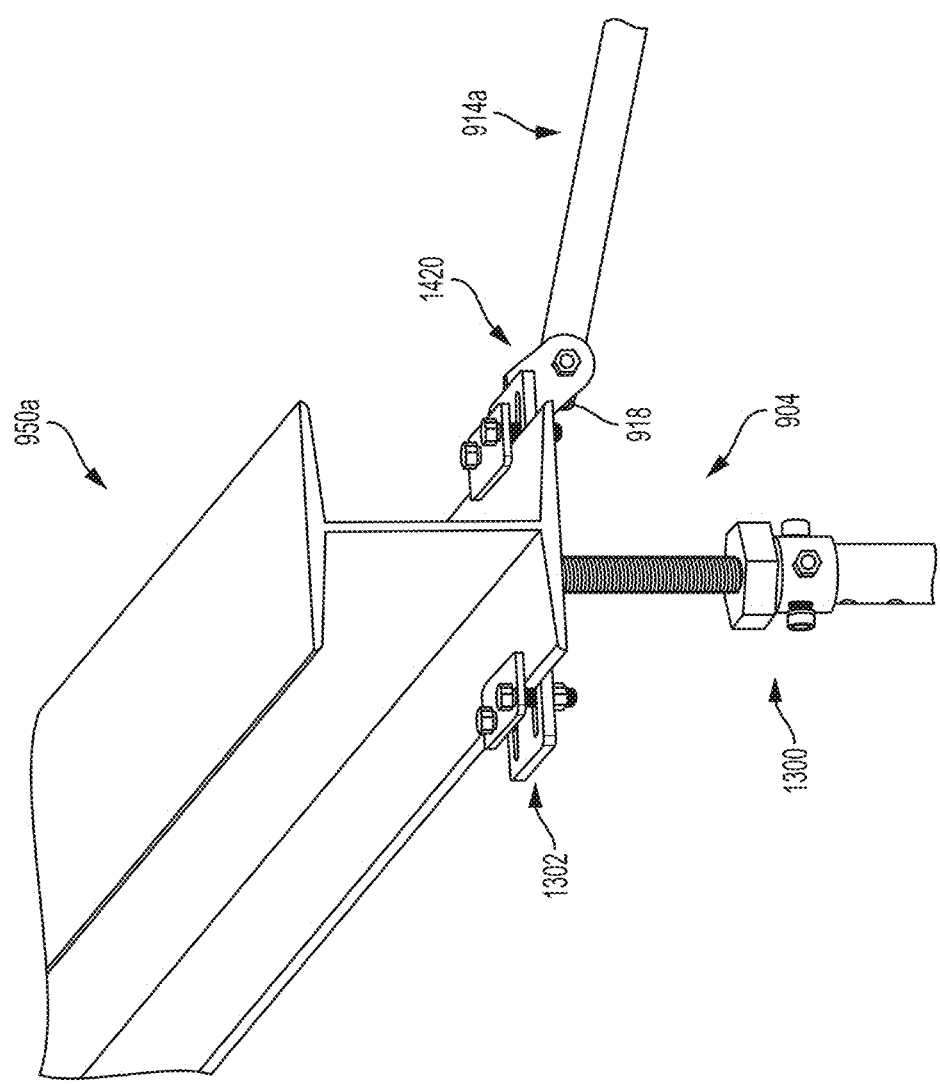
FIG. 13 is a top left perspective view of one of the support assemblies illustrated in FIG. 9, enlarged to show details of the pile head and the extendable member including the upper brace bracket.

Now referring to FIG. 13, the pile head 904 is generally similar to the pile head 104 described above and illustrated in FIGS. 1 to 8 and includes a mounting member 1300 for mounting the pile head 904 to the pile 902 and an extendable member 1302 movably mounted to the mounting member 1300. The extendable member 1302 is also adapted for receiving a corresponding support beam 950a or 950b and to move vertically relative to the mounting member 1300 to thereby raise or lower the support beam 950a, 950b and/or to level the support beam 950a, 950b.

In the embodiment illustrated in FIG. 13, the mounting member 1300 is generally similar to the mounting member 200 described above and therefore requires no further description.

Figure 14:
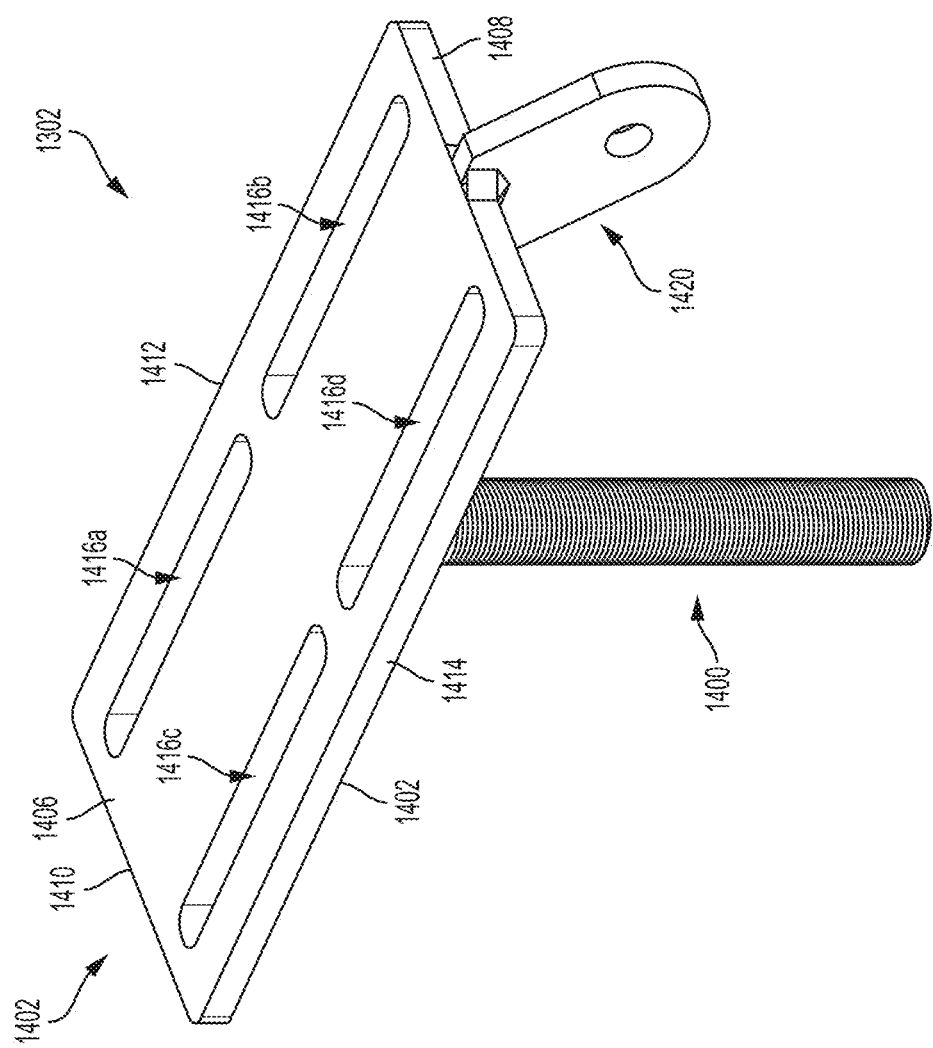
FIG. 14 is a top perspective view of an extendable member for the support assembly illustrated in FIG. 11.
Figure 15:
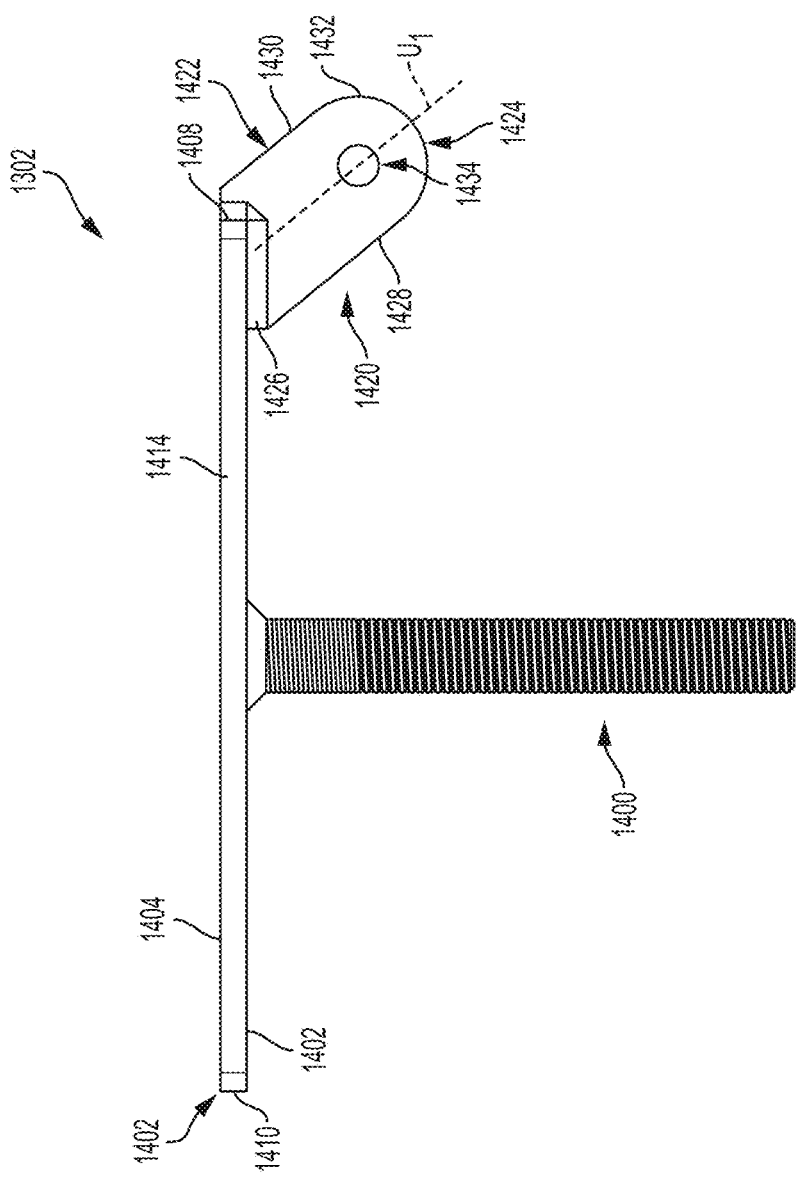
FIG. 15 is a front elevation view of the extendable member for the support assembly illustrated in FIG. 11.
Figure 16:
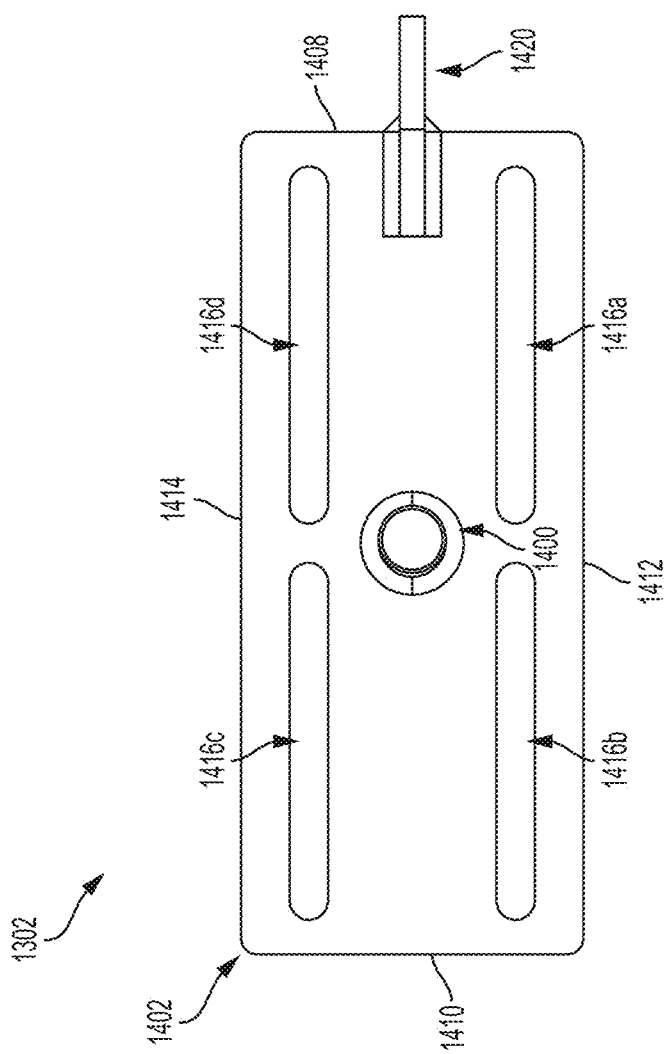
FIG. 16 is a bottom plan view of the extendable member for the support assembly illustrated in FIG. 11.

Turning now to FIGS. 14 to 16, the extendable member 1302 is also generally similar to the extendable member 202 described above and includes a threaded shaft 1400 configured for threadably engaging the mounting member 1300 and a support platform 1402 secured to the threaded shaft 1400 and disposed generally orthogonally to the threaded shaft 1400.

In the embodiment illustrated in FIGS. 14 to 16, the support platform 1402 is generally rectangular and has a bottom face 1404 from which the threaded shaft 1400 extends, a top face 1406 opposite the bottom face 1404, spaced-apart and parallel first and second side edges 1408, 1410 and spaced-apart and parallel third and fourth side edges 1412, 1414 which extend generally perpendicularly to the first and second side edges 1408, 1410.

In the embodiment illustrated in FIGS. 14 to 16, the support platform 1402 is further elongated, such that the first and second side edges 1408, 1410 are shorter than the third and fourth side edges 1412, 1414. In this configuration, the support platform 1402 defines a platform longitudinal axis $L_2$. Alternatively, the support platform 1402 could have any other shape which a skilled person would consider to be appropriate.

In the embodiment illustrated in FIGS. 14 to 16, the support platform 1402 includes a plurality of fasteners openings 1416 defined in the support platform 1402. Specifically, the support platform 1402 includes four fastener openings 1416a, 1416b, 1416c, 1416d, which are generally elongated and which extend generally parallel to the platform longitudinal axis $L_2$. The fastener openings are adapted to receive corresponding holding members 1304, shown in FIG. 13, which are adapted to engage and hold the corresponding support beam 950a or 950b.

The fasteners openings 1416a, 1416b, 1416c, 1416d and the holding members 1304 are similar to the fastener openings 600a, 600b, 600c, 600d and to the holding members 242 described above with references to FIGS. 1 to 8, and will therefore require no further description.

In the embodiment illustrated in FIGS. 14 to 16, the extendable member 1302 further includes an upper brace bracket 1420 which extends away from the first side edge 1408 of the support platform 1402 and which extends generally downwardly, away from the bottom face 1404 of the support platform 1402. Specifically, the upper brace bracket 1420 is generally flat and elongated, and defines a longitudinal axis $U_1$ which is angled relative to the support platform 1402.

Still in the embodiment illustrated in FIGS. 14 to 16, the upper brace bracket 1420 has a first end 1422 secured to the bottom face 1404 of the support platform 1402 and a second end 1424 located away from the first end 1422. Specifically, the upper brace bracket 1420 includes a straight connecting edge portion 1426 located at the first end 1422 and secured to the bottom face 1404 of the support platform 1402 by welding or any other appropriate securing techniques, a pair of straight and parallel side edge portions 1428, 1430 which are angled relative to the connecting edge portion 1426 and a free edge portion 1432 located at the second end 1424. In the embodiment illustrated in FIGS. 14 to 16, the free edge portion 1432 is rounded. Alternatively, the free edge portion 1432 could be squared instead of rounded, or the entire upper brace bracket 1420 could have a different shape.

Still referring to FIGS. 14 to 16, the upper brace bracket 1420 further includes an upper brace opening 1434 for receiving a first one of the brace members. In the illustrated embodiment, the upper brace opening 1434 is generally circular and is located towards the second end 1424 of the upper brace bracket 1420. Specifically, when the extendable member 1302 is properly mounted to the mounting portion 1300, the support platform 1402 is disposed in a generally horizontal plane and the upper brace bracket 1420 is disposed in a generally vertical plane. Moreover, in this configuration, the extendable members 1302 of each one of the first and second rows of support assemblies 900a, 900b are disposed such that their upper brace brackets 1420 are disposed towards the other one of the first and second rows of support assemblies 900a, 900b.

Now referring back to FIGS. 9 to 12, each support assembly 900 further includes a lower brace bracket 916 secured to the pile 902. In the illustrated embodiment, the lower brace bracket 916 includes an elongated mounting plate 1100 adapted to be placed against the pile 902, a vertical tab 1102 extending away from the mounting plate 1100 and a lower brace opening 1104 defined in the tab 1102.

Still in the illustrated embodiment, the top pile segment 908 of the pile 902 includes a plurality of spaced-apart mounting holes 1106 distributed vertically along the top pile segment 908. In the illustrated embodiment, the bottom pile segment 906 includes two corresponding mounting holes 1108 which extends through the top end 912 of the bottom pile segment 906 and which is adapted to be aligned with two adjacent mounting holes 1106 of the top pile segment 908 to allow the top pile segment 908 to be secured to the bottom pile segment 906. Depending on the mounting hole selected, the pile 902 can therefore be set to a desired length. Alternatively, the bottom pile segment 906 could include more or less than two mounting holes adapted to be aligned with a corresponding number of mounting holes 1106 of the top pile segment 908.

Still referring to FIGS. 9 to 12, the mounting plate 1100 includes upper and lower mounting holes 1110a, 1110b which are adapted to receive corresponding bracket mounting fasteners 1112. Moreover, the mounting holes 1108 of the bottom pile segment 906 are further adapted to receive at least one of the bracket mounting fasteners 1112. Specifically, the bracket mounting fasteners 1112 extends through the lower mounting hole 1110b of the mounting plate 1100, through the mounting holes 1108 of the bottom pile segment 906 and through the selected mounting holes 1106 of the top pile segment 908. The mounting plate 1100 is configured such that in this position, the upper mounting holes 1110a of the mounting plate 1100 is aligned with another one of the mounting holes 1106 of the top pile segment 908 and the mounting plate 1100 can be further fastened to the top pile segment 908 by inserting one of the bracket mounting fasteners 1112 through the upper mounting holes 1110a of the mounting plate 1100 and through the corresponding mounting holes 1106 of the top pile segment 908. Moreover, the lower brace bracket 916 of each one of the first and second rows of support assemblies 900a, 900b are disposed such that their tabs 1102 are disposed towards the other one of the first and second rows of support assemblies 900a, 900b.

As stated above, this configuration allows the support assemblies 900 in one of the first and second rows of support assemblies 900a, 900b to be connected to corresponding support assemblies 900 in the other one of the first and second rows of support assemblies 900a, 900b by the first and second crossed brace members 914a, 914b. In the illustrated embodiment, the first brace member 914a includes a first end 918 connected to the upper brace bracket 1420 of the support assemblies 900 in the first row of support assemblies 900a and a second end 920 connected to the lower brace bracket 916 of the support assemblies 900 in the second row of support assemblies 900b. Similarly, the second brace member 914b has a first end 922 secured to the upper brace bracket 1420 of the support assemblies 900 in the second row of support assemblies 900b and a second end 924 secured to the lower brace bracket 916 of the support assemblies 900 in the first row of support assemblies 900a.

In this configuration, the brace members 914a, 914b are therefore crossed. It will be appreciated that this configuration can help maintain the support assemblies 900 in the opposite rows 900a, 900b generally parallel to each other and spaced generally at the same distance from each other. Alternatively, the brace members 914a, 914b could extend generally horizontally between the support assemblies 900 instead of being crossed. In another embodiment, the brace members 914a, 914b could extend between adjacent support assemblies 900 in the same row, or between a first support assembly in a first one of the first and second rows of support assemblies 900a, 900b and another support assembly in the other one of the first and second rows of support assemblies 900a, 900b other than the one just opposite the first support assembly. In yet another embodiment, the support assemblies 900 could be adapted to be connected with more or less than two brace members which could also be arranged or configured differently. In still another embodiment, the support assemblies 900 could be generally similar to the support assemblies 100 illustrated in FIGS. 1 to 8 and simply not be adapted to be connected using any brace members.

In the illustrated embodiment, the support assembly 900 further includes a lateral reinforcement assembly 950 attached to the pile 902 to increase the pile's capacity to resist loads applied laterally. Specifically, the lateral reinforcement assembly 950 includes a central tubular member 952 disposed around the bottom pile segment 906 near its top end 912 and four vertical fins 954 extending radially outwardly from the tubular member 952. Each fin 954 has a generally trapezoidal shape and includes a top edge 956 which is generally horizontal and a bottom edge 958 which is angled relative to the top edge 956. In this configuration, the fin 954 defines a vertical inner edge 960 adjacent the tubular member 952 and a vertical outer edge 962 located opposite the inner edge 960 and which is shorter than the inner edge 960. Alternatively, the fins 954 could be rectangular or have any other shape which a skilled person may consider to be appropriate.

In the illustrated embodiment, the fins 954 are distributed evenly around the tubular member 952, such that the fins 954 extend generally perpendicularly to each other. Furthermore, when the support assemblies 900 are buried under the ground surface, the fins 954 may be oriented at about a 45 degree angle relative to a longitudinal axis of the structure being supported, such as a mobile home, to provide a constant lateral load-resisting capacity regardless of the direction in which the lateral load is applied.

Alternatively, the lateral reinforcement assembly 950 could include more or less than four fins, and the fins could be angled relative to each other at angles different than 90 degrees.

What is claimed is:

1. A pile assembly suitable for supporting a support beam of a support frame of a building structure, the pile assembly comprising:
    (a) a pile adapted to be buried into a ground surface, the pile having a top end;
    (b) a mounting member secured to the top end of the pile;
    (c) an extendable member movably mounted to the mounting member and comprising:
        a support platform adapted to receive the support beam of the support frame of the building structure thereon and having a longitudinal axis;
        a threaded shaft having a top end welded to the support platform and having a bottom end removably received in the mounting member;
        a holding member associated with the support platform, the holding member being movable relative to the platform in a direction parallel to the longitudinal axis and adapted to engage the support beam and prevent movement of the support beam relative to the support platform; and
    (d) at least one brace bracket disposed on the pile assembly, the at least one brace bracket structured to be connectable to a brace member for bracing the pile assembly.

2. The pile assembly of claim 1, further comprising a lateral reinforcement assembly attached to the pile.

3. A support assembly for supporting a building structure having a support frame having at least one support beam, the support assembly comprising:
    (a) a first pile assembly and a second pile assembly, each of the first and second pile assemblies comprising:
        (i) a pile adapted to be buried into a ground surface, the pile having a top end;
        (ii) a mounting member secured to the top end of the pile;
        (iii) an extendable member movably mounted to the mounting member and comprising:
            a support platform securable to the mounting member and adapted to receive the at least one support beam of the support frame of the building structure thereon;
            a threaded shaft having a top end welded to the support platform and having a bottom end removably received in the mounting member;

(iv) holding member associated with the support platform, the holding member being movable relative to the platform in a direction parallel to the longitudinal axis and adapted to engage the at least one support beam and prevent movement of the at least one support beam relative to the support platform;
(v) at least one first brace bracket disposed on the first pile assembly;
(vi) at least one second brace bracket disposed on the second pile assembly; and
(b) at least one brace member connectable to the at least one first brace bracket of the first pile assembly and to the at least one second brace bracket of the second pile assembly.

4. The support assembly of claim 3, wherein in an assembled condition, the pile of the first pile assembly is buried into the ground surface, the at least one first brace bracket of the first pile assembly downwardly projects from a bottom surface of the support platform, and the at least one first brace bracket of the first pile assembly includes an opening therein.

5. The support assembly of claim 3, wherein:
the at least one first brace bracket of the first pile assembly includes a first upper brace bracket and a first lower brace bracket secured to the first pile assembly; and
the at least one second brace bracket of the second pile assembly includes a second upper brace bracket and a second lower brace bracket secured to the second pile assembly.

6. The support assembly of claim 5, wherein the at least one brace member includes a first brace member and a second brace member.

7. The support assembly of claim 6, wherein in an assembled condition, the first brace member connects the first upper brace bracket of the first pile assembly to the second lower brace bracket of the second pile assembly.

8. The support assembly of claim 7, wherein in an assembled condition, the second brace member connects the second upper brace bracket of the second pile assembly to the first lower brace bracket of the first pile assembly.

9. The support assembly of claim 6, wherein in an assembled condition, the first brace member connects the first upper brace bracket of the first pile assembly to the second upper brace bracket of the second pile assembly.

10. The support assembly of claim 9, wherein in an assembled condition, the second brace member connects the first lower brace bracket of the first pile assembly to the second lower brace bracket of the second pile assembly.

11. The support assembly of claim 9, wherein the first brace member is substantially horizontal to the second brace member.

12. The support assembly of claim 5, wherein the first upper brace bracket of the first pile assembly and the second upper brace bracket of the second pile assembly each extends diagonally outwardly from the bottom surface of the support platform.

13. A support assembly for supporting a building structure having a support frame having at least a first support beam and a second support beam, the support assembly comprising:
(a) a first pile assembly and a second pile assembly, each of the first and second pile assemblies comprising:
a pile adapted to be buried into a ground surface, the pile having a top end;
a mounting member secured to the top end of the first pile;
(b) an extendable member movably mounted to the mounting member and comprising:
a support platform adapted to receive the support beam of the support frame of the building structure thereon and having a longitudinal axis;
a threaded shaft having a top end welded to the support platform and having a bottom end removably received in the mounting member;
a holding member associated with the support platform, the holding member being movable relative to the platform in a direction parallel to the longitudinal axis and adapted to engage the first support beam and prevent movement of the first support beam relative to the support platform;
(c) at least one first brace bracket disposed on the first pile assembly;
(d) at least one second brace bracket disposed on the second pile assembly; and
(e) a brace member connectable to the at least one first brace bracket of the first pile assembly and to the at least one second brace bracket of the second pile assembly.

14. A method of installing a support assembly for supporting a building structure having a support frame having at least one support beam, the method comprising:
(a) assembling a first pile assembly and a second pile assembly, each of the first and second pile assemblies comprising:
(i) a pile adapted to be buried into a ground surface, the pile having a top end;
(ii) a mounting member secured to the top end of the pile;
(iii) an extendable member movably mounted to the mounting member and comprising:
a support platform adapted to receive the support beam of the support frame of the building structure thereon and having a longitudinal axis;
a threaded shaft having a top end welded to the support platform and having a bottom end removably received in the mounting member;
(iv) a holding member associated with the support platform, the holding member being movable relative to the platform in a direction parallel to the longitudinal axis and adapted to engage the first support beam and prevent movement of the first support beam relative to the support platform;
(v) at least one first brace bracket disposed on the first pile assembly;
(vi) at least one second brace bracket disposed on the second pile assembly;
(b) putting the first pile assembly into a ground surface;
(c) putting the second pile assembly into the ground surface; and
(d) connecting a brace member to the at least one first brace bracket of the first assembly and to the at least one second brace bracket of the second assembly to brace the first pile assembly and the second pile assembly.

15. The method of claim 14, wherein the method further comprises adjusting the brace member.

16. The method of claim 15, wherein the method further comprises adjusting at least one of the first pile assembly and the second pile assembly.

17. The method of claim 15, wherein:
the at least one brace bracket of the first pile assembly is a first upper brace bracket and a first lower brace bracket;

the at least one second brace bracket of the second pile assembly is a second upper brace bracket and a second lower brace bracket; and connecting a brace member to the at least one first brace bracket of the first pile assembly and to the at least one second brace bracket of the second pile assembly is connecting a first brace member to the upper brace bracket of the first support assembly and to the lower brace bracket of the second support assembly; and further comprising connecting a second brace member to the lower brace bracket of the first support assembly and to the upper brace bracket of the second support assembly.

18. The method of claim 15, further comprising, prior to connecting a brace member to the at least one brace bracket of the first support assembly and to the at least one brace bracket of the second support assembly, adjusting a length of the brace member.

19. The pile assembly of claim 1, further comprising the holding member being adjustable along the longitudinal axis of the support platform.

\* \* \* \* \*